J. H. AND W. J. HANLON.
GAUGE GLASS.
APPLICATION FILED MAR. 7, 1918.

1,424,642. Patented Aug. 1, 1922.

INVENTORS
John H. Hanlon & William J. Hanlon
by MacLeod, Calver, Copeland & Dike
Attys.

UNITED STATES PATENT OFFICE.

JOHN H. HANLON, OF SOMERVILLE, AND WILLIAM J. HANLON, OF FITCHBURG, MASSACHUSETTS.

GAUGE GLASS.

1,424,642. Specification of Letters Patent. Patented Aug. 1, 1922.

Application filed March 7, 1918. Serial No. 220,948.

*To all whom it may concern:*

Be it known that we, JOHN H. HANLON and WILLIAM J. HANLON, citizens of the United States, residing at Somerville, in the county of Middlesex, and Fitchburg, in the county of Worcester, both in the State of Massachusetts, have invented a certain new and useful Improvement in Gauge Glasses, of which the following is a specification, reference being had therein to the accompanying drawings.

Our invention has for its object a new and improved gauge glass for use on steam boilers, and particularly on steam boilers of locomotives. The particular object of the invention is to provide a gauge glass of the so-called bull's-eye type which shall be more readily visible than gauge glasses of this type as heretofore constructed. We are aware that bull's eye gauge glasses having bull's eyes with plane surfaces have heretofore been constructed, these being arranged ordinarily so that two bull's eyes are opposite each other and the light passes through from one side to the other of the gauge glass. Such a gauge glass requires double the number of bull's eyes and it must be properly located and illuminated or otherwise it will be useless. It has also been proposed to make a bull's eye gauge glass provided with a plurality of bull's eyes each constructed on the principle of the large glass shown and described in the patent to Klinger No. 470,858 dated March 15, 1892. Such gauge glasses have bull's eyes on one face only and the opposite face is of any opaque material. Such gauge glasses have the advantage that they may be placed with their back against the boiler and do not require to be located in such a position that the engineer can look through from one side to the other of the gauge glass. It has been found however that the water line in such gauge glasses is difficult to observe and is often indistinct.

Our invention therefore has for its object to produce a gauge glass of the latter type but having bull's eyes so constructed that the illumination will be greatly improved and so that the water line may be clearly and sharply visible.

The invention will be fully understood from the following description taken in connection with the accompanying drawings and the novel features thereof are pointed out and clearly defined in the claims at the close of this specification.

Referring now to the drawings, Fig. 1 shows a gauge glass embodying my invention.

Figure 1:
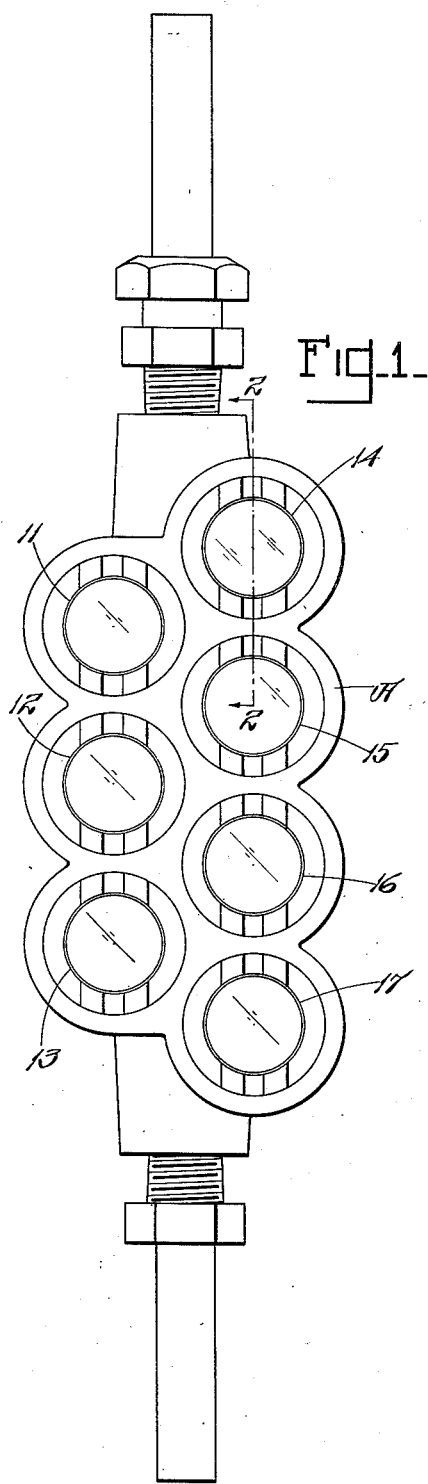
Figure 2:
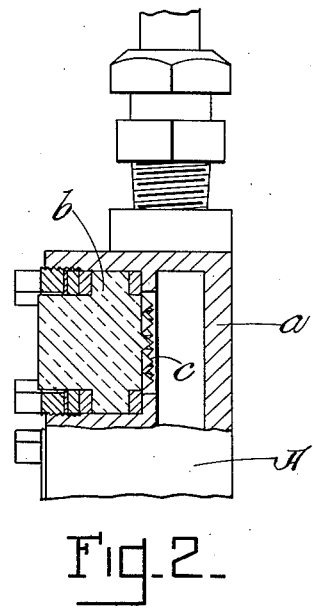
Fig. 2 is a section on line 2—2 of Fig. 1.
Figures 3, 4:
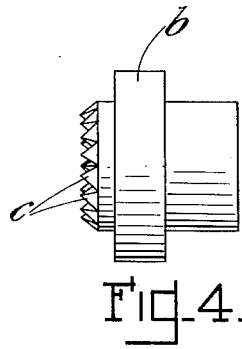
Fig. 3 is a rear face view of one of the bull's eyes.
Fig. 4 is a side elevation of the bull's eye shown in Fig. 3.

In the drawings, at A is shown the body of the gauge which is of suitable metal. It has an opaque metal back as shown at $a$ in Fig. 2. At 11, 12 and 13, and at 14, 15, 16 and 17 are shown sight openings arranged in two columns staggered with relation to each other so that the water line may be seen through one or the other regardless of its vertical position in the gauge glass. Each sight opening is closed by a glass bull's eye, the preferred form of which is shown in Figs. 3 and 4. Each bull's eye is provided with an annular flange $b$ for engagement with suitable gaskets and nuts, not necessary to be described in detail. The rear face of the bull's eye is provided with a plurality of pyramidal projections $c$ arranged concentrically around the centre of the circular rear face of the bull's eye. These pyramidal projections each have four triangular faces which in the form shown in Figs. 3 and 4 do not lie at equal angles to each other. The pyramids being concentrically arranged around the centre, do not arrange themselves straight into rows in any direction so that it is not necessary for the bull's eye to be accurately positioned in the frame. This is a great advantage as no care in this regard is required in the installation of the bull's eyes.

Figures 5, 6:
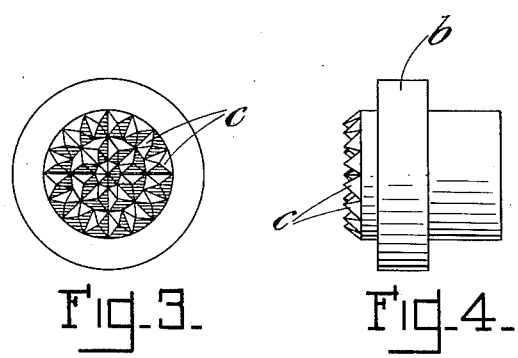
Fig. 5 is a rear face elevation of a bull's eye of modified form.
Fig. 6 is a side elevation of the bull's eye shown in Fig. 5.

In Figs. 5 and 6, we show the use of conical holes or indentations forming reciprocal projections instead of pyramids, the conical holes being concentrically arranged about the centre of the rear face of the bull's eye.

We find in actual use that the use of projections in place of parallel ribs and grooves as described in the Klinger patent heretofore mentioned results in the production of a very much more satisfactory gauge glass since the illumination under the same conditions of use is much improved. Where bull's eyes made as described herein are employed, the space above the water line has a brilliant silvery appearance and is sharply divided from the water which appears to be black. This is of great importance as it makes it much easier for the engineer to observe the position of the water line in the boiler.

In using the term projections in this specification and the claims appended hereto, we intend to include projections of all practical shapes, but the term as employed does not include ribs such as are used in the Klinger gauge glass, and over which our gauge glass is a great improvement.

What we claim is:

1. In a water gauge for boilers the combination of a body having an opaque rear face and a sight opening closed by a cylindrical glass the interior face of which is furnished with a plurality of projections disposed in a plurality of concentric circles, said projections being also disposed in such manner that they avoid straight line rows in any direction.

2. In a water gauge for boilers the combination of a body having an opaque rear face and a sight opening closed by a cylindrical glass plug the interior face of which is furnished with a plurality of projections each formed with a plurality of faces which lie at varying angles to each other.

3. In a water gauge for boilers the combination of a body having a sight opening closed by a glass the interior face of which is furnished with a plurality of pyramidal projections, each projection being formed with a plurality of faces which lie at varying angles to each other.

4. In a water gauge for boilers the combination of a body having a sight opening closed by a glass plug the interior face of which is furnished with a plurality of pyramidal projections, each projection being formed with a plurality of triangular faces, some of the adjacent faces of each projection lying at a different angle to each other from the angle formed by other adjacent faces of the same projection.

5. In a water gauge for boilers the combination of a body having a sight opening closed by a glass plug the interior face of which is furnished with a plurality of pyramidal projections, each projection being formed with a plurality of faces which lie at varying angles to each other, said projections being disposed in non-rectilinear rows in any direction.

6. In a water gauge for boilers the combination of a body having an opaque rear face and a sight opening in another face closed by a cylindrical glass the interior face of which is furnished with a plurality of projections, each projection being formed with a plurality of faces which lie at varying angles to each other, said projections being disposed in rows which are non-rectilinear in any direction.

7. In a water gauge for boilers the combination of a body having an opaque rear face and a sight opening closed by a glass the interior of which is furnished with a plurality of pyramidal projections, disposed in such manner that they avoid straight line rows in any direction.

In testimony whereof we affix our signatures.

JOHN H. HANLON.
WILLIAM J. HANLON.